United States Patent [19]

Easton et al.

[11] Patent Number: 4,736,298

[45] Date of Patent: Apr. 5, 1988

[54] METHOD OF DETECTING COLLARS USING COMPUTERIZED PATTERN RECOGNITION

[75] Inventors: Steven B. Easton; Norman R. Carlson; James C. Barnette, all of Houston, Tex.

[73] Assignee: Western Atlas International, Inc., Houston, Tex.

[21] Appl. No.: 839,490

[22] Filed: Mar. 14, 1986

[51] Int. Cl.$^4$ .......................... G01D 1/40; G01D 5/12
[52] U.S. Cl. .................................. 364/420; 340/856; 73/155; 73/151
[58] Field of Search ............... 364/420, 421, 422, 562, 364/571; 250/258, 257, 268, 269; 340/856, 870.12, 870.26; 73/155, 1 D, 15, 151

[56] References Cited

U.S. PATENT DOCUMENTS

| | | | |
|---|---|---|---|
| 4,342,911 | 8/1982 | French | 250/258 |
| 4,568,933 | 2/1986 | McCracken | 73/155 |
| 4,662,209 | 5/1987 | Brown | 364/422 |

OTHER PUBLICATIONS

Dresser Atlas Casing Evaluation Services–The Magnelog Survey, pp. 4–5 and 61–78, 1985.

Primary Examiner—Michael R. Fleming
Attorney, Agent, or Firm—Patrick H. McCollum

[57] ABSTRACT

A method of determining the location and dimensions of collars present along a section of casing. An inspection instrument is passed through the casing section generating an electromagnetic wave which permeates the casing. The phase shifted electromagnetic wave is detected by a receiver and a data string comprising the degree of phase shift present at each point along the casing section is created. The data string is processed to identify the location of collars present along the casing section. Upon the identification of a collar, a series of pattern recognition interrogations are used to confirm the collar location and to determine the collar's dimensions.

15 Claims, 4 Drawing Sheets

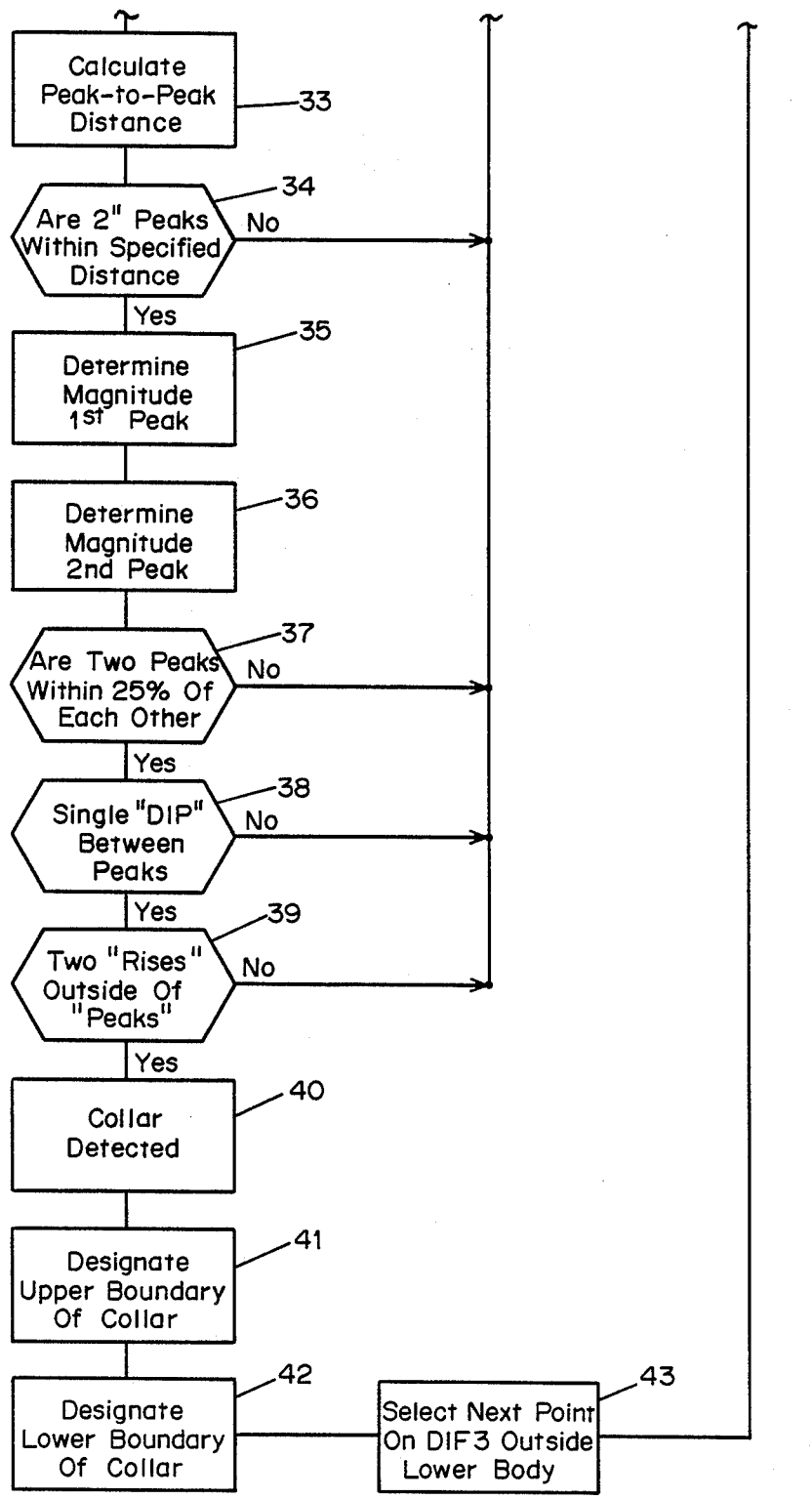

METHOD OF DETECTING COLLARS USING COMPUTERIZED PATTERN RECOGNITION

BACKGROUND OF THE INVENTION

This invention relates to methods of evaluating the condition of oilfield tubular goods and the extent of internal wear of subsurface pipe or casing. More specifically, this invention relates to methods for locating collars on either a worn or unworn string of drill pipe.

The determination of the location and dimensions of casing collars are important steps in procedures for determining the degree of internal wear present in a length of casing. A variety of problems may result from internal casing wear. Drill pipe collars may rub the casing, and possibly lead to a blowout in the casing if extremely worn. In a production well, badly worn casing may permit the undesirable "thiefing" of the flow to unwanted zones and thereby reduce surface production. In an injection well, worn casing may permit the injected fluid to flow to undesired formations.

Internal wear, which is the removal of metal from the inside casing wall occurs in three principal patterns: loss of metal from only part of the inside casing wall while the rest is unworn; uniform loss of metal around the entire inside casing wall circumference; and non-uniform loss of metal around the entire inside casing wall. In addition, there are two patterns associated with unworn casing—round internally with all of the original metal in place, and elliptical with all of the metal in place.

A number of surveys are available for assessing internal wear in downhole casing. One such survey provides a depth recording which responds to the circumferential average of the wall thickness of the casing metal still in place. In particular, this survey detects changes of the wall thickness and internal diameter of downhole casing. A typical inspection instrument for performing this survey is the casing inspection instrument marketed by Dresser Atlas under the name "Magnalog tool" and disclosed in the publication "Dresser Atlas Casing Evaluation Services," pages 4–5 and 62–63; said publication being herein incorporated by reference. During operation, an inspection instrument generates an alternating (AC) magnetic field of low frequency. As the tool passes through the survey interval, the field permeates the casing wall and is detected by the receiver portion of the tool. The received electromagnetic wave is both attenuated and phase shifted by the casing wall, with the degree of phase shift in relationship to the wall thickness (weight). The degree of phase shift is detected and tranmitted over the wireline for surface recording.

The phase shift curve registers the phase shift between generation of the low frequency electromagnetic wave and reception of the wave by the tool's receiver portion. The degree of phase shift increases with the increasing thickness of the casing's wall. The degree of phase shift may then be used in the calculation of the average thickness of the casing wall.

A problem arises, however, when pipe collars are present along the casing length being surveyed. The presence of a pipe collar causes a noticeable change in the phase shift curve response at the point corresponding to the location of the pipe collar which in turn results in an increase in the calculated average thickness of the casing wall at the location of the pipe collar. The casing wall thickness calculations are so distorted by the presence of the collars that accurate casing wall thickness calculations cannot be made for those sections of the casing where collars are located, and some method of editing out the inaccurate calculations of casing wall thickness becomes necessary. While the editing out of the collars after the calculation of the average wall thickness has often been suggested as a solution to the problem, this method results in a waste of valuable processing time by calculating average wall thickness for numerous sections of casing that will later be excluded. Instead, removal of the collar responses from the phase shift curve before the calculation of casing wall thickness is considered one method of maintaining the accuracy of the casing wall thickness calculation while minimizing processing time. However, the use of this approach presents additional problems when one considers that moderately to severely worn casing will often be the subject of this survey. While collars are readily recognizable on the phase shift curve of unworn casing, as being indicated by the presence of a characteristic response located at regular intervals of the casing length, the characteristic response indicating a collar becomes much more difficult to detect when the collar is flushed or welded and particularly when the casing becomes worn. Thus, a method to detect collars under these extreme casing conditions also became necessary.

SUMMARY OF THE INVENTION

An inspection instrument traverses a section of casing in order to identify the location and dimensions of all casing collars present in the casing section under investigation. As the inspection instrument passes through the casing, the inspection instrument generates an electromagnetic wave which permeates the casing where the electromagnetic wave is both attenuated and phase shifted. The phase shifted electromagnetic wave is detected by a receiver and compared to the original electromagnetic wave by a phase comparator to determine the degree of phase shift. The degree of phase shift is directly related to the wall thickness of the casing section and thus may be used to identify the location and dimensions of collars within the casing section.

The present invention analyzes a data string comprising the degree of phase shift present at each point along the casing section. A data curve is calculated by taking the second derivative of each point of the data string. The activity around each point of the data curve is then calculated and compared to a preselected reference value in order to make a preliminary determination of whether a collar is located at that data point. Should there be a preliminary determination of a collar, the data curve then undergoes a series of pattern recognition interrogations in order to confirm the collar determination and calculate the collar's dimensions.

A feature of this invention is to determine the location and dimensions of collars present within a section of either worn or unworn casing. Another feature of this invention is to provide information necessary for the determination of the degree of internal wear present within a casing section.

BRIEF DESCRIPTION OF THE DRAWINGS

The present invention may be better understood, and its numerous objects and advantages will become apparent to those skilled in the art by reference to the accompanying drawings.

DESCRIPTION OF THE PREFERRED EMBODIMENT

Figure 1:
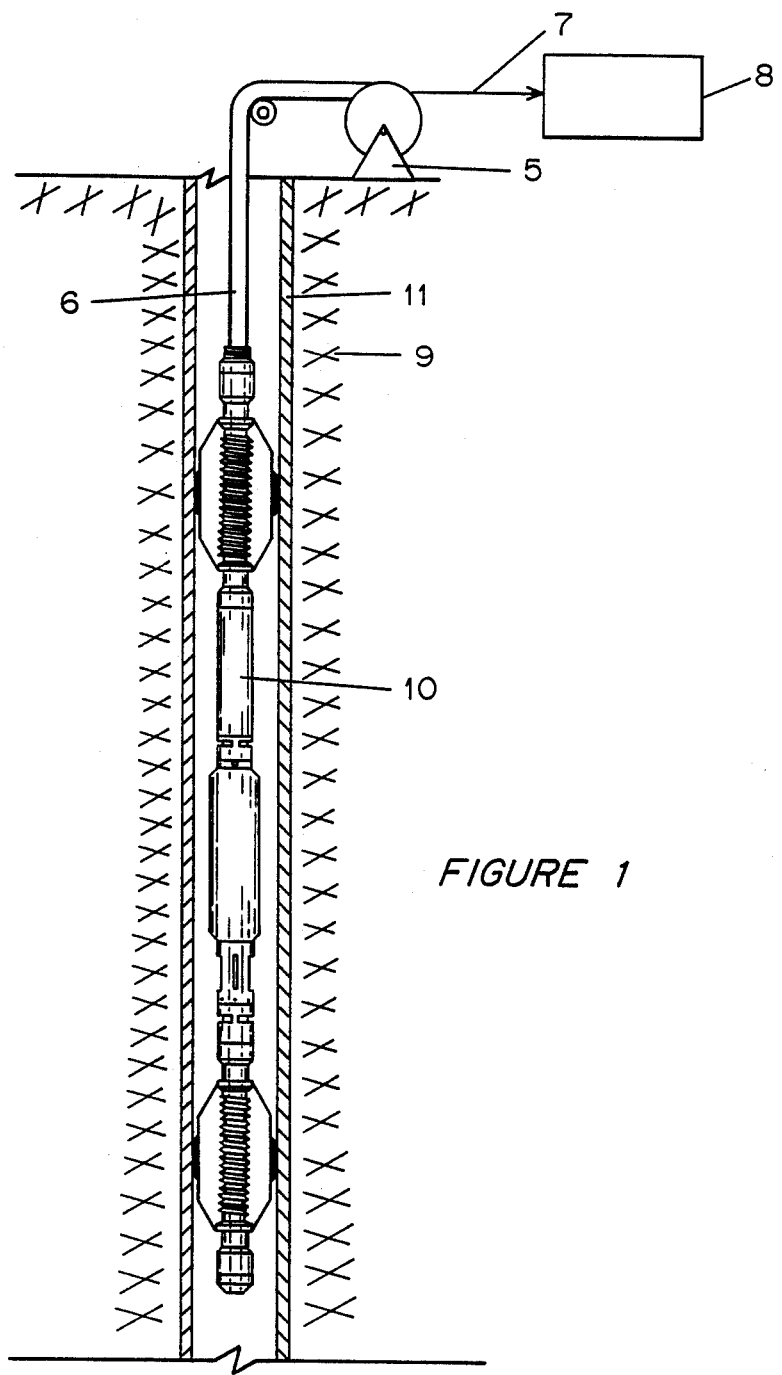
FIG. 1 is a representation of the inspection instrument in operation in accordance with the principles of the present invention.

Referring to FIG. 1, a preferred embodiment of the inspection instrument 10 incorporating the principles of the present invention is shown as it will appear during the course of a typical inspection operation of a length of well piping such as a section of casing 11 which is ordinarily employed for lining the wall of a well bore 9. The inspection instrument 10 is suspended from a length of typical multi-conductor logging cable 6 which is spooled in the usual fashion on a winch 5 that is positioned at the surface and adapted for selectively moving the inspection instrument 10 through the casing 11. The conductors within the cable 6 are operatively connected by way of typical surface circuitry 7 to a data processing system 8 for the processing of the output signals from the inspection instrument.

Figure 2:
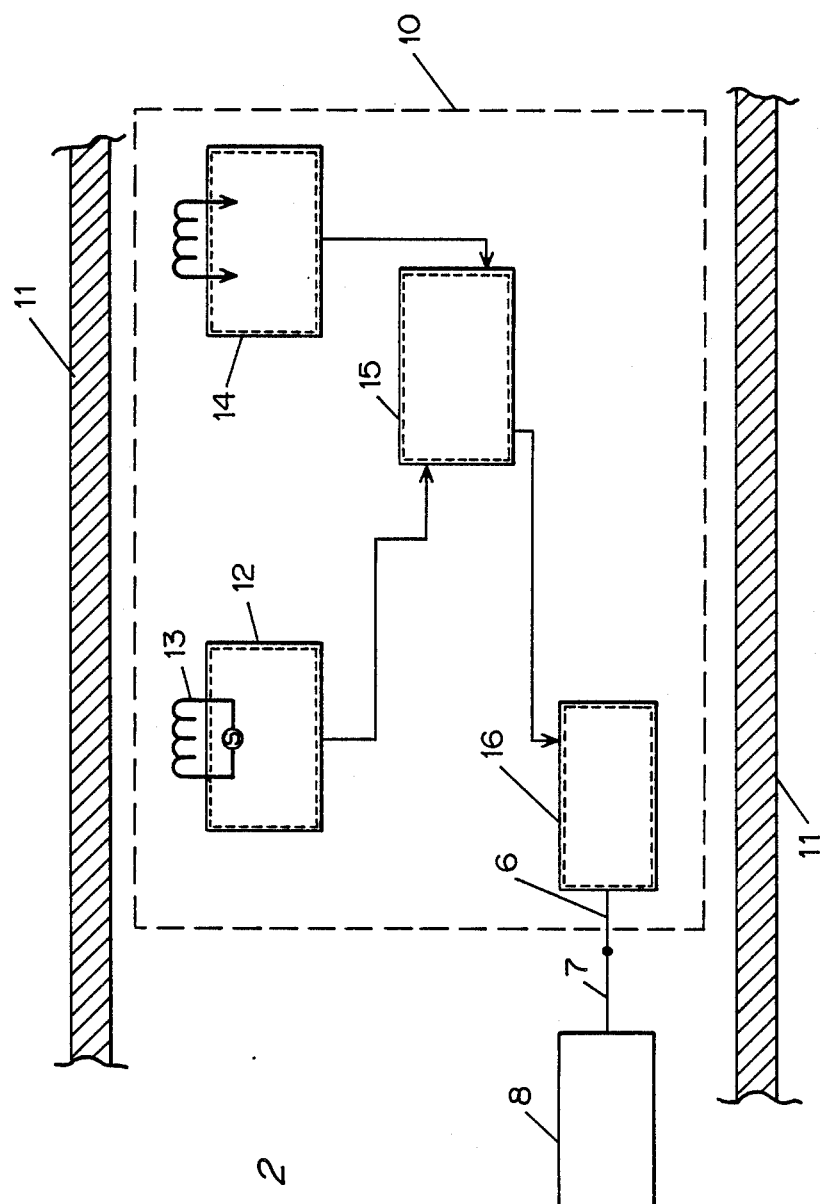
FIG. 2 is a block diagram of the major components of the inspection instrument located within a casing section under inspection for the determination of casing collar locations.

Referring to FIG. 2, as the inspection instrument 10 traverses the casing section 11 being surveyed, a low frequency oscillator 12 within the inspection instrument 10 generates an electromagnetic wave which excites a transmitter coil 13 which in turn generates an alternating (a.c.) magnetic field of low frequency. In addition, the output of oscillator 12 is coupled to a phase comparator 15. The electromagnetic field permeates the casing section 11 where the electromagnetic field in both attenuated and phase shifted by the casing section 11. The degree of phase shift of the electromagnetic field is directly related to the wall thickness of the casing section. The attenuated and phase shifted electromagnetic field is detected by a low frequency receiver 14 and is transmitted by the low frequency receiver 14 to a phase comparator 15. The phase comparator 15 compares the two received electromagnetic waves and determines the phase shift for the surveyed casing section 11. The output of the phase comparator 15 is coupled to a line driver 16 for transmission of the detected phase shift via a multi-conductor logging cable 6 and surface circuitry 7 to a data processing system 8 for analysis and editing of the received data.

As the inspection instrument 10 traverses the casing section 11, the above-described procedure is repeated continuously, with the end result being that the data transmitted to the data processing system 8 consists of a data string comprising the degree of phase shift present at each point along the casing section 11 under inspection.

Figure 3:
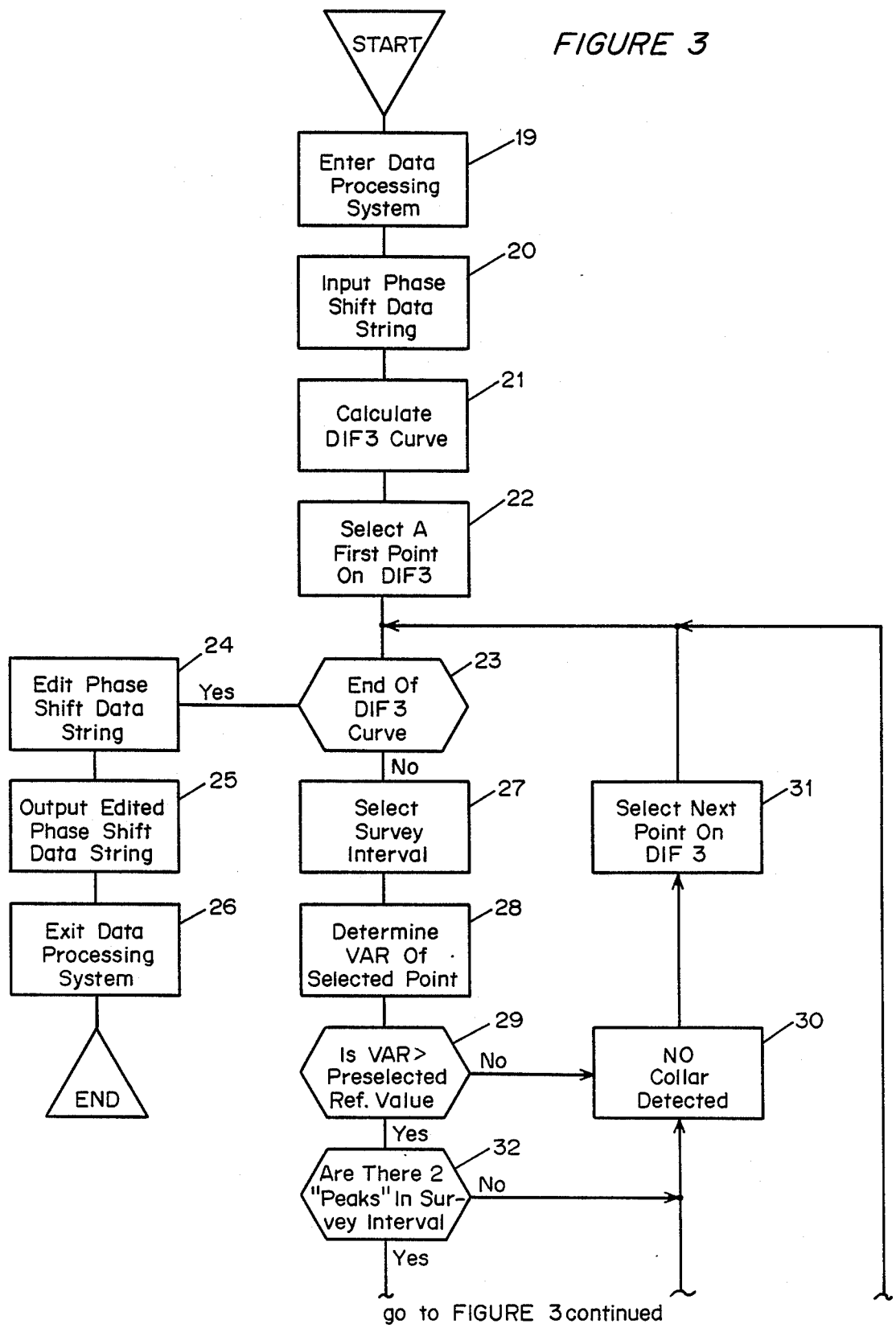
FIG. 3 is a flowchart of the major steps of processing the data string received from the inspection instrument.

Referring to FIG. 3, the data procesing system 8 of FIGS. 1 and 2 is described in greater detail. The data processing system is entered at step 19. A data string comprising the degree of phase shift at each point along the casing string under inspection is input into the data processing system at 20. A data curve DIF3 is calculated at 21 by taking the second derivative of each point of the data string. A first point on data curve DIF3 corresponding to the beginning of the casing section 11 to be analyzed is selected at 22. Further data manipulation will cease, and the data processing system will proceed to step 24 should it be determined at step 23 that the data point selected corresponds to the end of the casing section 11 to be analyzed. The data string comprising the degree of phase shift at each point along the casing string under inspection will be edited at 24 to remove all points on the data string corresponding to collars detected by the analysis of the DIF3 curve. The edited phase shift data string is then output to a display means such as a log presentation chart at 25. The data processing system is then exited at 26.

Returning to step 23, if the data point selected does not correspond to the end of the casing section 11 to be analyzed, processing will continue at 27. A survey interval of preselected length is designated at 27 such that the selected data point lies at the midpoint of the survey interval. Responses of the data curve DIF3 lying within the survey interval are summed at 28 to calculate the variance (VAR) of the selected point. The variance (VAR) of the selected point is compared at 29 to a preselected magnitude reference value, such as 0.8. Should the VAR of the selected point fail to exceed the preselected reference value, a determination of no collar at the selected point is made at 30, the next point on data curve DIF3 is selected at 31 and the data processing system returns to step 23 for further processing. Should the VAR of the selected point exceed the preselected reference value, a preliminary determination of the presence of a collar at the selected point may be made. Such a preliminary determination of a collar location has been found by the inventor to be only 95% accurate and thus unsatisfactory for many purposes. Indeed, spurious results occur most frequently along heavily worn sections of casing, the very casing sections which are most often the primary points of interest during casing inspections. Thus, a series of additional steps, designed to increase the accuracy of the preliminary determination of the presence of a collar at the selected point, commences at 32.

The survey interval is examined at 32 to determine if there are two "peaks" present within the survey interval. (A "peak" being defined as a first response of predetermined polarity on the DIF3 data curve whih exceeds a second preselected magnitude reference value, such as 0.8) Should two "peaks" fail to be identified within the selected interval, a determination of no collar at the selected point is made at 30, the next point on data curve DIF3 is selected at 31 and the data processing system returns to step 23 for further processing. If two "peaks" are identified within the selected interval at 32, the peak-to-peak distance will be calculated at 33. Proceeding to step 34, the distance between the two peaks is compared to a preselected separation distance reference value, such as 2 feet. If the peak-to-peak distance is less than the preselected separation distance reference value then a determination of no collar at the selected point is made at 30, followed by selection of the next point on data curve DIF3 at 31 and a return of the data processing system to step 23 for further processing. If the peak-to-peak distance is within the preselected separation distance reference value, the magnitude of the first peak and the magnitude of the second peak will be measured at steps 35 and 36 respectively. The magnitudes of the two peaks will be compared at 37. Should the two peaks fail to have magnitudes within a preselected magnitude comparison reference value, such as 25%, a determination of no collar at the selected point will be made at 30, followed by a selection of the next point on data curve DIF3 at 31 and a return of the data processing system to step 23 for futher processing. However, if a comparison of the magnitudes of the two peaks at 37 results in a determination of the magnitudes being within the preselected magnitude comparison reference value, the selected interval will be examined at 38 for the presence of a single "dip" between the two peaks. (A "dip" being defined as a second response of polarity opposite to said predetermined polarity on the DIF3 curve which exceedes a third preselected magnitude reference value, such as 0.8). If no "dip" is located along the portion of the selected interval located between the two peaks, a determination of no collar at the selected point will be made at 30, followed by the selection of the next point on data curve DIF3 at 31 and a return of the data processing system to step 23 for further processing. Should a "dip" be located at 38, the portions of the selected interval outside of the peaks will be examined at 39 for the presence of "rises" (a "rise" being defined as a third response of polarity opposite to said predetermined polarity on the DIF3 curve which exceeds a fourth preselected magnitude reference value, such as 0.4, said fourth preselected magnitude reference value typically being of lesser magnitude than said third preselected magnitude reference value). Should a single "rise" be identified and located between the outer edge of each peak and the respective boundary of the selected interval, the detection of a collar at the selected point will be designated at 40. The absence of two such rises at 39 will result in a determination of no collar at the selected point at 30, followed by the selection of the next point on data curve DIF3 at 31 and a return of the data processing system to step 23 for further processing.

Returning to step 40, after the detection of a collar at the selected point at step 40, the upper boundary of the detected collar is designated at 41 as located at the point along the survey interval corresponding to the outer edge of the upper rise. The outer edge of the rise is defined as the edge of the rise furthest from the selected point. The lower boundary of the detected collar is then designated at 42 as located at the point along the survey interval corresponding to the outer edge of the lower rise. The next point on data curve DIF3 outside of the detected collar lower boundary is selected at 43 followed by the return of the data processing system to step 23 for further processing.

Thus, there has been described and illustrted herein methods of detecting casing collars using computerized pattern recognition. However, those skilled in the art will recognize that many moficiations and variations besides those specifically mentioned may be made in the techniques described herein without departing substantially from the concept of the present invention. Accordingly, it should be clearly understood that the form of the invention described herein as exemplary only, and is not intended as a limitation on the scope of the present invention.

The embodiment of the invention in which an exclusive property or privilege is claimed are defined as follows:

1. A method of determining the location of collars present in a casing section under inspection by passing an inspection instrument through said casing and submitting the outputs of said inspection instrument to a process of analysis comprising the steps of:
   a. deriving, from said outputs of said inspection instrument, responses forming a data curve;
   b. selecting a point of said data curve;
   c. selecting a survey interval of said data curve such that said point is within said interval;
   d. summing the responses of said data curve located within said survey interval;
   e. comparing the summation of said responses of said data curve within said survey interval to a first reference value;
   f. determining from said comparison whether a collar is located at said point; and
   g. repeating steps (b) through (f) for each point of said data curve.

2. The method of claim 1 further comprising the steps of:
   h. examining said survey interval of each point of said data curve corresponding to a collar location for two responses of a first predetermined polarity within said survey interval of magnitude exceeding a second reference value;
   i. comparing the magnitude of said two responses of a first predetermined polarity;
   j. determining the separation distance between said two responses of a first predetermined polarity;
   k. comparing said separation distance to a separation distance reference value; and
   l. determining the location of collars within said casing section under inspection in response to said comparison of said separation distance and said separation distance reference value and said comparison of said magnitude of said two responses of a first predetermined polarity.

3. The method of claim 2 further comprising the steps of:
   m. examining said survey interval of each point of said data curve corresponding to a collar location for a first response of a second predetermined polarity located between said two positive responses exceeding a third reference value; and
   n. determining the location of collars within said casing section under inspection.

4. The method of claim 3 further comprising the steps of:
   o. examining said survey interval of each point of said data curve corresponding to a collar location for a second response of said second predetermined polarity (located between the upper boundary of said survey interval and the closest of said positive responses) exceeding a fourth reference value;
   p. examining said survey interval of each point of said data curve corresponding to a collar location for a third response of said second predetermined polarity (located between the lower boundary of said survey interval and the closest of said positive responses) exceeding a fourth reference value; and
   q. determining the location of collars within said casing section under inspection.

5. The method of claim 4 further comprising the step of designating the section of said survey interval between said second and third responses of said second predetermined polarity as a collar interval.

6. The method of claim 5 further comprising the step of editing said outputs of said inspection instrument to remove any data point corresponding to a collar interval on said data curve.

7. The method of claim 6 further comprising the step of displaying the edited output of said inspection instrument.

8. A method of determining the location of collars present in a casing section under inspection by passing an inspection instrument through said casing and submitting the outputs of said inspection instrument to a process of analysis comprising the steps of:

a. deriving, from said outputs of said inspection instrument responses forming a data curve;
b. selecting a point of said data curve;
c. selecting a survey interval of said data curve such that said point is within said interval;
d. summing the responses of said data curve within said survey interval;
e. comparing the summation of said response, of said data curve within said survey interval to a first reference value;
f. making an initial determination from said comparison of whether a collar is located at said point;
g. examining said survey interval for said point if an initial determination of a collar at said point has been made, for a first and second responses of a first predetermined polarity within said survey interval of magnitude exceeding a second reference value;
h. comparing the magnitude of said two responses of a first predetermined polarity;
i. determining the separation distance between said first and second responses of a first predetermined polarity;
j. comparing said separation distance to a separation distance reference value;
k. examining said survey interval for a first response of a second predetermined polarity (located between said two positive responses) of magnitude exceeding a third reference value;
l. examining said survey interval for a second response of said second predetermined polarity (located between the upper boundary of said survey interval and the closest of said positive responses) of magnitude exceeding a fourth reference value;
m. examining said survey interval for a third response of said second predetermined polarity (located between the lower boundary of said survey interval and said closest of said positive response) of magnitude exceeding said fourth reference value;
n. making a final determination of whether a collar is located at said point;
o. designating the section of said data curve between said second and third responses of said second predetermined polarity as a collar interval;
p. selecting a next data point along said data curve outside of said collar interval; and
q. repeating steps (c) through (p) for said next data point.

9. The method of claim 8 further comprising the step of editing said outputs of said inspection instrument to remove any data points corresponding to a collar interval on said data curve.

10. The method of claim 9 further comprising the step of displaying the edited output of said inspection instrument.

11. A method of determining the location of collars present in a casing section under inspection comprising the steps of:

(a) passing an inspection instrument through said casing section;
(b) generating a first electromagnetic wave;
(c) detecting a second electromagnetic wave;
(d) comparing said first and second electromagnetic waves;
(e) deriving a first measurement from said comparison of said first and second electromagnetic waves; and
(f) analyzing said first measurement to determine the location of collars.

12. The method of claim 11 wherein said step (d) of comparing said electromagnetic waves comprises the step of comparing the phase of each said wave.

13. The method of claim 11 wherein said step (f) of analyzing said first measurement comprises the steps of:

(a) deriving a data curve from said first measurement; and
(b) analyzing said data curve to determine the location of collars.

14. The method of claim 13 further comprising the step of editing said first measurement in response to said analysis of said data curve.

15. The method of claim 14 further comprising the step of displaying said edited first measurement.

* * * * *